United States Patent [19]
Zegers-Ten Horn

[11] 3,742,642
[45] July 3, 1973

[54] PROJECTILE GAME APPARATUS WITH TONE PRODUCING TARGET

[76] Inventor: Henriette J. Zegers-Ten Horn, 5004 Rodman Road, Washington, D.C. 20016

[22] Filed: June 22, 1971

[21] Appl. No.: 155,526

[52] U.S. Cl............ 46/13, 46/177, 35/8 R, 84/470, 273/102.1 B
[51] Int. Cl............................................ A63b 71/02
[58] Field of Search............ 273/95 R, 101, 102 R, 273/102.1 B, 102.1 R; 46/177, 13; 84/470, 471; 35/8 R

[56] References Cited
UNITED STATES PATENTS
3,677,130  7/1972  Petrejcik............................ 84/471
3,648,386  3/1972  Stone.................................. 35/8 R OTHER PUBLICATIONS
Kohner Bros, Inc., 3/10/66, "See A Tune", The learning Toy Program, 3/10/66

Primary Examiner—Richard C. Pinkham
Assistant Examiner—Marvin Siskind
Attorney—Thomas E. Beall, Jr.

[57] ABSTRACT

A projectile target having three planar sheets hinged to form a generally upright screen with the central panel having a plurality of different geometrically shaped through apertures with different tone producing bells mounted therein, and a central puppet threatre opening with draw curtains on the sides. Each of the tone producing means is adapted to be struck by a projectile thrown at them to produce a tone of the musical scale as indicated by the indicia associated therewith, which is different from the ones produced by the other bells, so that a relationship may be established from the from the ones produced by the other bells, so that a relationship may be established between a physical representation, the geometric shape, and a musical tone of the standard scale, the sound of the bell struck. The side sheets have through openings in the shape of human figures for further games and the teaching of geometric relationships. Distances involved with the throwing of a bag or the like projectile at the bells and the abstract relationship of musical scales tones with physical configurations are taught to students or players of the game, particularly blind people.

8 Claims, 1 Drawing Figure

PATENTED JUL 3 1973
3,742,642
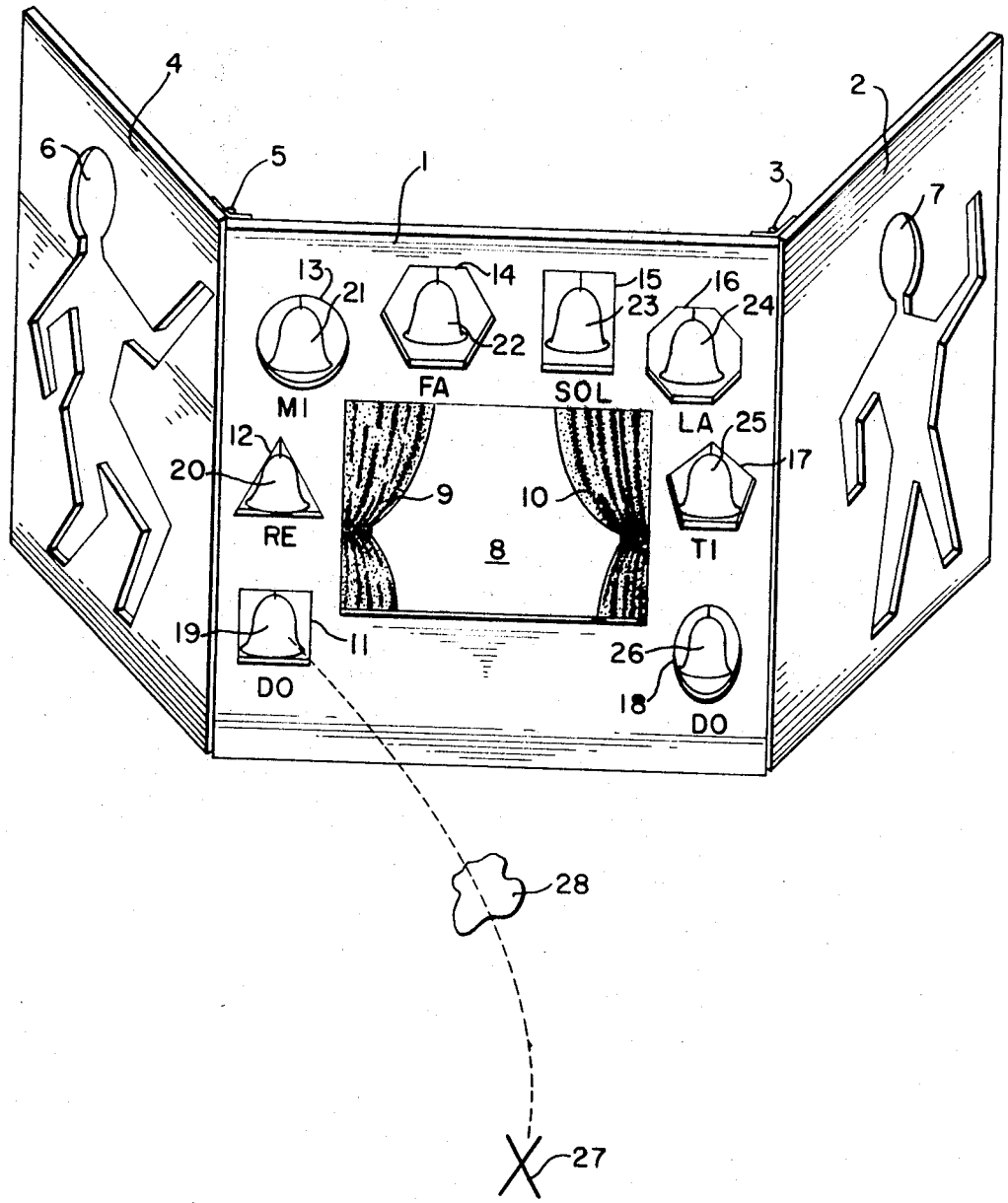
INVENTOR
HENRIETTE J. ZEGERS-TEN HORN
Thomas E. Beall, Jr.
ATTORNEY

PROJECTILE GAME APPARATUS WITH TONE PRODUCING TARGET

BACKGROUND OF THE INVENTION

There are many games involving the use of projectiles and targets having particular geometric shapes or means for producing audible sounds when struck by the thrown projectile to amuse children and the like, and they have proved quite satisfactory for this limited purpose. Also, various means and methods have been used in an attempt to teach the musical scale to students. Further, hinged three-panel screens have been used with a central panel being cut out and provided with side curtains for the production of puppet shows and the like. However, the teaching of the abstract relationship between the musical scales and geometric or indicia relationships have proved to be rather unsatisfactory and particularly boring, while the various projectile and audible sound target games though enjoyable have not been particularly instructive for any purpose other than manual dexterity. Further, the teachings of manual dexterity, distance relationships, geometric shapes, musical scales and the abstract correlation between musical scales and physical relationships have separately proved to be particularly troublesome with respect to blind children. Further, games employing the representation of human figures are quite well known per se.

Apparatus and methods for teaching the above relationships have proved to be quite cumbersome, demanding of storage and set-up space for small facilities, and boring in use to the participants. While at the same time, various games employing targets and projectiles while considerably more enjoyable have proved to be rather intellectually unstimulating and generally noninstructive.

SUMMARY OF THE INVENTION

It is an object of the present invention to provide a single unit employing all of the above functions and methods while taking up no more set-up or storage room than a foldable conventional three-piece puppet theater screen. The hinged three-panelled construction of the basic support may be easily folded to where the panels are parallel to each other for storage or extended in a typical screen position to be self-supporting on the floor or the like. The side screens are provided with cut-outs in the shapes of human figures for the playing of various games to the general enjoyment of the participants.

The central panel of the screen is provided with a generally central opening having curtains on each side to function as a puppet theater. In a generally U-shaped configuration, opening downwardly, extending about the puppet theater opening, there are provided a plurality of materially different geometrically shaped through openings. Preferably, the openings correspond in number to the musical scale do, re, mi, fa, sol, la, ti, do and are provided with individual indicia to this affect. Separate bells are hung in each of the geometrically configured openings to produce different musical tones, corresponding respectively to the notes associated with their openings.

The teaching of distances as correlated to time, particularly for blind children is performed by having the participant stand at some distance from the screen and throw a projectile so as to strike one of the bells. The teaching of the abstract relationship between a physical characteristic such as the geometric shape of the opening to a tone of the musical scale, as produced by the struck bell within the opening, is accomplished with the same throwing of the projectile repeated a sufficient number of times so that the relationships are maintained firmly in mind, particularly for a blind participant. For sighted students or participants, the indicia associated with the bells and geometrically configured openings further aid in the teaching of the abstract musical tone relationships.

The entire apparatus takes up very little room when in use and even less room when stored, particularly when compared with prior art apparatus for performing the various individual functions. Further, the apparatus and method of the present invention combine to maintain the interest of the participants so that to them the entire procedure is a most enjoyable game.

BRIEF DESCRIPTION OF THE DRAWING

Further objects, features and advantages of the present invention will become more clear from the following detailed description of the drawing, wherein: the single FIGURE of the drawing illustrates a preferred embodiment of the present invention.

DETAILED DESCRIPTION OF THE DRAWING

As shown in the single FIGURE of the drawing, the general support board of the target for the apparatus is in the form of a hinged three-panel self-supporting screen and includes a central panel 1, a side panel 2, hinged at 3 to one side of the central panel 1, and an opposite panel 4, hinged at 5 to the opposite side of the central panel 1. From the illustrated use position wherein the three-panel screen rests in a self-supporting manner upon a planar surface such as a floor, in the perspective illustration, the support board may be folded to where the three panels 1, 2 and 4, are parallel with the side panels 2 and 4 overlapping each other behind the central panel 1. In this folded position, the device may be stored while taking up a minimum amount of room.

The side panels 2 and 4 each have cut-outs in the shape of human figures 6 and 7, respectively. These cut-outs extend completely through the side panels and are of a size and approximately corresponding to the size of small children for which the apparatus is particularly designed to facilitate the playing of games. These figure cut-outs 6, 7 are particularly useful in the method of teaching blind children geometric relationships in that the children may realize that they may pass through the openings with their arms and legs in the illustrated positions and thereafter feel in detail the outline of the cut-outs to form an overall idea of the shape of their bodies and others as projected on a single plane. While sighted children particularly understand single plane illustrations such as photographs, images in a mirror, and shadows of three-dimensional objects, such a relationship is extremely difficult to convey to a blind child who has perhaps never seen in his entire life.

In the center of the central panel 1, there is provided a generally rectangular opening 8 extending completely through the panel and provided with curtains 9, 10 on each side of the opening to form a puppet theater or the like. As may be well understood, the puppet theater is particularly useful in teaching and entertaining small children in combination with the side panels 2 and 4 that support the central puppet theater panel and for sighted children shield the puppet manipulators from view.

Arranged in a generally downwardly opening U-shaped configuration about the puppet theater opening 8 there are provided generally equally spaced through cut-outs 11, 12, 13, 14, 15, 16, 17 and 18. Each of these cut-outs has a materially different geometric configuration, for example, cut-outs 11, 12, 13 represent a square, triangle and circle, respectively. While any geometric configuration is contemplated and will generally serve the purpose, the better known geometric configurations are preferred.

In each one of the geometrically configured cut-outs 11 – 18, there is suitably mounted a percussion device for producing an audible sound. According to the preferred embodiment bells are provided although it is understood that according to the broader aspects of the present invention other means may be used such as tuning forks. Each of the bells 19, 20, 21, 22, 23, 24, 25, 26, produces a materially different sound and preferably corresponds to one of the basic tones in the musical scale do, re, mi, fa, sol, la, ti, do. The bells may be made of a different size, different material, different thickness or the like to produce the variations in tone. Further, it is contemplated that if tuning forks, musical triangles or other flatter tone producing means were used, the cut-outs could be blind holes, that is according the broader aspects of the present invention they might not extend all the way through the central panel 1, which would further shield the puppet manipulators from the view of the audience when the puppet theater is in use.

When the board is being used for entertainment and teaching of the musical scale, the participant will sit, stand, kneel or the like at position 27 and hurl a projectile, such as a bean bag 28, at the central panel 1. If the bean bag 28 hits one of the bells 19 – 26, the audible sound produced will be a corresponding tone of the musical scale. For example, if the bell 21 is struck, the tone corresponding to mi of the musical scale will be produced. The teacher may then instruct the student to examine the bell 21 and the geometric configuration of the cut-out 13 associated therewith, that is the circle, and after sufficient repetitions explain the relationship to fix in their mind the correlation between a physical identity and a musical tone. The projection examination and instruction would be repeated as necessary all during the playing of a very enjoyable projectile game. Further, particularly with respect to a blind student, the time that is takes for the bean bag to reach a bell and produce a tone correlated with the distance travelled by the student to reach and touch the bell will give the blind student some feeling for distances. For assisting the instructor of blind students and for further instructing sighted students, the indicia do, re, mi, fa, sol, la, ti, do are associated respectively with the bells 19 – 26 whose tones they represent and the correlated geometric figures of the cut-outs 11 – 18. The board may be used in other manners to produce the tones for example by allowing the participant to strike the bells with a hammer or finger.

Thus, it is seen that a very simple three-part board can be folded to a compact storage position, open to a screen position for use in various games and at the same time provide a support means for a large variety of objects so arranged as to greatly facilitate the teaching of complex abstract associations between planar figures, three dimensional distances, musical language and audible musical tones.

While a single preferred embodiment to the present invention has been specifically illustrated, further embodiments, modifications and variations are contemplated within the broader aspects of the invention as mentioned throughout the specification and defined by the spirit and scope of the following claims.

What is claimed is:

1. A teaching game apparatus comprising: a support member; a plurality of spaced openings formed in said support member; each of said openings being shaped as a materially different three-dimensional shape; and a like plurality of percussion tone producing means mounted on said support member closely adjacent respective shapes and each producing a musical tone in response to being struck, which tone is materially different from the tones produced by the other of said percussion tone producing means, whereby there will be a correlation established between a geometric shape and a musical tone.

2. The apparatus of claim 1, wherein said percussion musical tone producing means are so inter-related that the tones produced thereby each correspond to one of the tones of the musical scale do, re, mi, fa, sol, la, ti, do.

3. The apparatus of claim 2, wherein there are eight separate openings forming said shapes along a path and eight separate percussion tone producing means, each corresponding to one of the tones of the musical scale do, re, mi, fa, sol, la, ti, do, in order around the path.

4. The apparatus of claim 3, including indicia means labeling each one of the openings and percussion tone producing means according to its tone of the scale by an appropriate indicia selected from the group consisting of: do, re, mi, fa, sol, la, ti, do.

5. The apparatus of claim 4, wherein said support means includes a first planar rigid sheet having said openings extending therethrough, and two rigid side sheets hingedly connected to opposite sides of said first mentioned sheet for forming a three-panelled stand to be supported directly by a floor or other planar surface in a self-supporting manner; said openings being arranged in downwardly opening U-shaped pattern in said first sheet; a central opening within the area of said first sheet enclosed by said U-shaped pattern; said central opening having curtains on its opposite sides forming puppet theater means; and said side sheets each having a materially different opening extending entirely therethrough in the general shape of a human figure and with a size to provide a through passage for children.

6. The apparatus of claim 1, wherein said support member includes a central planar rigid sheet having side rigid sheets hingedly connected on opposite sides thereof for pivotal movement about parallel axes to form a composite self-sustaining screen like stand.

7. The apparatus of claim 6, wherein said central sheet includes a central opening and having curtains on its opposite sides for forming a puppet theater means.

8. The apparatus of claim 1, wherein each of said percussion tone producing means is a bell.

* * * * *